(12) United States Patent
Adinarayan et al.

(10) Patent No.: US 10,089,169 B2
(45) Date of Patent: *Oct. 2, 2018

(54) IDENTIFYING SOLUTIONS TO APPLICATION EXECUTION PROBLEMS IN DISTRIBUTED COMPUTING ENVIRONMENTS

(71) Applicant: International Business Machines Corporation, Armonk, NY (US)

(72) Inventors: Geetha Adinarayan, Bangalore (IN); Anindya Neogi, Bangalore (IN); Vinay G. Rajagopal, Yelahanka New Town (IN); Rohit Shetty, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/202,803

(22) Filed: Jul. 6, 2016

(65) Prior Publication Data

US 2016/0314034 A1    Oct. 27, 2016

Related U.S. Application Data

(63) Continuation of application No. 14/611,430, filed on Feb. 2, 2015, now Pat. No. 9,465,685.

(51) Int. Cl.
*G06F 11/07* (2006.01)

(52) U.S. Cl.
CPC ........ *G06F 11/079* (2013.01); *G06F 11/0706* (2013.01); *G06F 11/0709* (2013.01);
(Continued)

(58) Field of Classification Search
None
See application file for complete search history.

(56) References Cited

U.S. PATENT DOCUMENTS 6,029,258 A * 2/2000 Ahmad ................. G06F 11/366
714/26
6,742,141 B1 5/2004 Miller
(Continued)

OTHER PUBLICATIONS

IBM, "Problem Signature Capture for Automatic Problem Detection," IP.com No. IPCOM000134612D, Original Publication Date: Mar. 13, 2006, IP.com Electronic Publication: Mar. 13, 2006, 3 pages.

(Continued)

*Primary Examiner* — Yolanda L Wilson
(74) *Attorney, Agent, or Firm* — Nicholas D. Bowman

(57) ABSTRACT

An expert system extracts events associated with executing an application from log files generated by various topological resources in a distributed computing environment. The events are plotted as plot points on a time series graph. Patterns are identified in the plot points that are associated with application problems, along with the computing environment configurations both before the problem and after the problem was resolved. The difference in the configurations represents a corrective action for the application problem, and the expert system links the corrective action to the pattern. When a pattern repeats in conjunction with another application problem, the corrective action is identified as a possible solution to the new problem. A confidence level associated with the pattern/corrective action may be increased when a user accepts the corrective action and may be decreased when a user rejects the corrective action.

18 Claims, 4 Drawing Sheets

(52) U.S. Cl.
CPC ...... *G06F 11/0751* (2013.01); *G06F 11/0766* (2013.01); *G06F 11/0775* (2013.01); *G06F 11/0793* (2013.01)

(56) References Cited

U.S. PATENT DOCUMENTS

| | | | |
|---|---|---|---|
| 7,191,364 B2 | 3/2007 | Hudson et al. | |
| 7,293,201 B2* | 11/2007 | Ansari | G06F 11/0715 714/25 |
| 7,490,073 B1 | 2/2009 | Qureshi et al. | |
| 7,827,154 B1 | 11/2010 | Spertus et al. | |
| 8,032,866 B1 | 10/2011 | Golender et al. | |
| 8,365,019 B2 | 1/2013 | Sailer et al. | |
| 8,527,811 B2 | 9/2013 | Gilbert et al. | |
| 2009/0055684 A1 | 2/2009 | Jamjoom et al. | |
| 2009/0063387 A1 | 3/2009 | Beaty et al. | |
| 2011/0154117 A1 | 6/2011 | Danielson et al. | |
| 2013/0198565 A1* | 8/2013 | Mancoridis | G06F 11/008 714/26 |
| 2014/0250334 A1* | 9/2014 | Watanabe | G06F 11/3409 714/37 |
| 2015/0271008 A1 | 9/2015 | Jain et al. | |
| 2015/0370626 A1 | 12/2015 | Miyagawa et al. | |

OTHER PUBLICATIONS

Microsoft et al, "Pattern Matching to Automatic Solution Discovery Using Disparate Data Sources," IP.com No. IPCOM000160821D, Original Publication Date: Nov. 30, 2007, Electronic Publication Date: Nov. 30, 2007, 12 pages.

Song, Y. et al, "Hierarchical Online Problem Classification for IT Support Services," IEEE Computer Society, IEEE Transactions on Services Computing, vol. 5, No. 3, Jul.-Sep. 2012, 13 pages.

Adinarayan et al., "Identifying Solutions to Application Execution Problems in Distributed Computing Environments", U.S. Appl. No. 14/611,430, filed Feb. 2, 2015.

IBM, List of IBM Patents or Patent Applications Treated as Related, Jun. 30, 2016, 2 pages.

* cited by examiner

IDENTIFYING SOLUTIONS TO APPLICATION EXECUTION PROBLEMS IN DISTRIBUTED COMPUTING ENVIRONMENTS

BACKGROUND

The present disclosure relates to handling application execution problems in distributed computing environments, and more specifically relates to using pattern recognition and self-learning techniques to identify solutions to problem conditions associated with the execution of applications in distributed computing environments.

A distributed computing environment is a software system in which components, or resources, located on networked computers communicate and coordinate their actions. The network topology refers to the arrangement of the various resources in the distributed computing environment. A computer program or application executing in a distributed computing environment may span across various resources and may be dependent on several sub-transactions and system components to complete a task. A resource will typically maintain a log file of events that occur while the resource is in operation.

SUMMARY

Disclosed herein are embodiments of a method, computer program product, and computer system for identifying a solution to a problem condition. The problem condition is associated with the execution of an application that utilizes multiple topological resources in a distributed computing environment. The individual topological resources log events associated with executing the application and store the logs in log files. An expert system extracts events from the log files. Events are identified by an error type, a log type, a time of occurrence, and the topological resource that logged them. The events are plotted as plot points on a graph. The graph has an x-axis representing the time of occurrence of the event, and has a y-axis representing the topological resource that logged the event. Each plot point represents a combination of the error type and the log type. A pattern is identified in the plot points. The pattern is temporally associated with an earlier problem condition associated with executing the application. A pre-problem configuration and a post-problem configuration of the distributed computing environment are associated with the start of the earlier problem condition and the end of the earlier problem condition, respectively. The configuration changes needed to convert the pre-problem configuration to the post-problem configuration represent a corrective action for the earlier problem condition. The expert system links this corrective action to the pattern.

A second pattern is identified in the plot points. The second pattern is temporally associated with the problem condition. Based on comparing the pattern to the second pattern, the expert system identifies the corrective action for the earlier condition as the solution to the problem condition. In some embodiments, the expert system displays parts of the graph and the corrective action to a user, receives a response from the user, and modifies a confidence level for the corrective action as the solution to the problem condition based on the received response.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
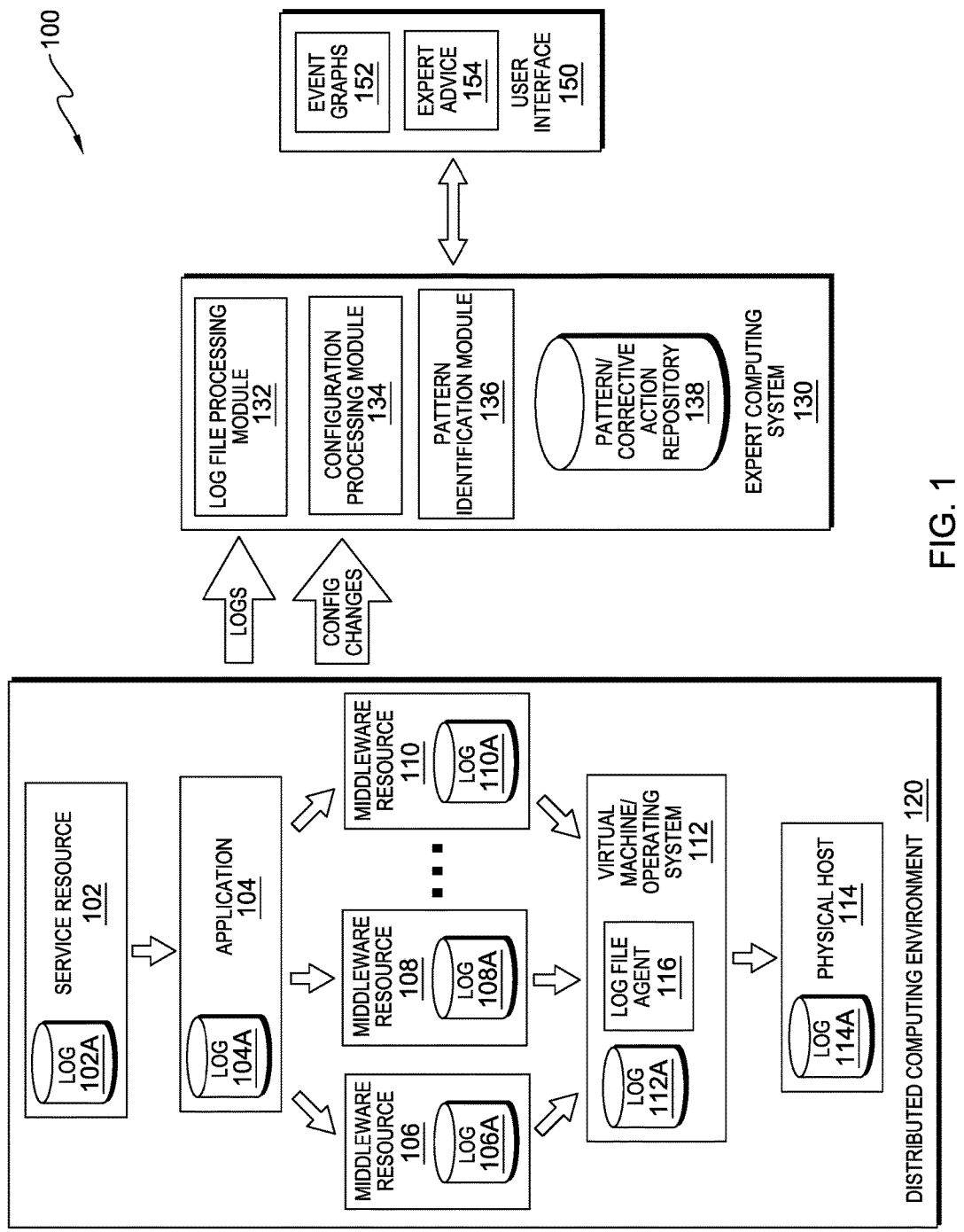
FIG. 1 is a block diagram illustrating an example expert computing system for identifying solutions to application execution problems in a distributed computing environment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to handling application execution problems in distributed computing environments, and more particular aspects relate to using pattern recognition and self-learning techniques to identify solutions to problem conditions associated with the execution of applications in distributed computing environments. While the present disclosure is not necessarily limited to such applications, various aspects of the disclosure may be appreciated through a discussion of various examples using this context.

A distributed computing application may span across various components of middleware and may be dependent on several sub-transactions and system components to complete tasks. Such components may be referred to as resources. Events occurring during execution of these tasks may be logged in various log files depending upon which topological resource in the application architecture was in use at the time of the event. These logs and traces may be collected from the various resources and may be indexed into a data store for analysis.

When application or infrastructure problems occur, the indexed logs may be searched in an attempt to identify solutions. Typically, a human operator or user must execute multiple searches of the various logs, and must then attempt a manual problem pattern analysis. Multiple searches and manual analyses may be cumbersome in an environment where a simple transaction may involve multiple middleware components.

A human operator may be limited to analyzing log data that was collected within a narrow time window of the occurrence of the problem or outage, which may limit visibility into the problem. Furthermore, manual processes performed by human operators may be time-consuming and may delay identification of solutions. Identified solutions may require involvement of multiple enterprises from multiple operations groups to apply required fixes. Intelligent, real-time grouped problem pattern detection and automatic detection of pre-problem configurations and post-problem configurations may help identify corrective actions.

FIG. 1 is a block diagram illustrating 100 an example expert computing system 130 for identifying solutions to application execution problems in an example distributed computing environment 120. Within example distributed computing environment 120 are a number of topological resources, including service resource 102, application 104, middleware resource 106, middleware resource 108, middleware resource 110, virtual machine/operating system 112, and physical host 114. In some embodiments, the distributed computing environment may have more resources, fewer resources, or different resources than those depicted in FIG. 1.

Log files 102A, 104A, 106A, 108A, 110A, 112A, and 114A may be generated at the various topological resources. Events associated with execution of application 104 may be stored in the various log files. The log files may be provided to the expert computing system 130. In some embodiments, the log files may be provided continuously as they are updated. In some embodiments, the log files may be provided according to a predetermined schedule. In some embodiments, the log files may be provided in response to a stimulus, such as an error or other problem condition or a request. Any suitable process for providing log files to the expert computing system 130 is contemplated. For example, one or more log file agents 116 may push the log files to the expert computing system. Although a single agent 116 running on the virtual machine/operating system 112 is depicted, various embodiments may include multiple agents running on various resources in the distributed computing environment.

When the expert computing system 130 receives the log files, a log file processing module 132 may analyze the log files during the ingestion process to extract structural information such as error codes, host names, method names, etc. The log file processing module may then annotate the log files and index the log files using the structural information. Entries in a log file may be identified by log type, error type, time of occurrence, topological resource, and other identifiers. The log type may describe the type of log, such as an event log or an error log. The error type may describe the type of error, such as a read error or a write error.

In addition to the log files, configuration changes to distributed computing environment 120 may also be provided to the expert computing system 130. This allows the expert computing system 130 to know the configuration state of the topological resources in the distributed computing environment 120 at various points in time. Configuration changes may include resource additions, resource deletions, resource replacements, reconfigurations of one or more resources, software updates, hardware updates, fixes, etc. Any suitable process for providing configuration changes to the expert computing system 130 is contemplated. For example, one or more agents may push the configuration changes to the expert computing system. In some embodiments, the same agent or agents 116 that provides the log files also provides the configuration changes.

When a problem condition arises associated with execution of an application, the expert computing system 130 may search the annotated, indexed logs and extract events associated with the execution of the application. A log analysis system may enable users, such as information technology administrators or application support engineers, to navigate the relevant grouped logs from a single interface to identify problem patterns and to locate root cause events. The extracted events may be plotted on a time series graph having a first axis, such as an x-axis, representing the time of occurrence and a second axis, such as a y-axis, representing the topological resource. The plot point itself may represent a combination of the error type and the log type. The event graph 152 may be displayed on a user interface 150. In some embodiments the x-axis and the y-axis may be switched.

A pattern identification module 136 may identify a pattern in the plot points derived from the extracted events. The identified pattern may have a start time and an end time on the graph. The expert computing system 130 may then access its pattern/corrective action repository 138 to determine whether the identified pattern is linked to one or more corrective actions. If the pattern is linked to one or more corrective actions, the expert computing system 130 may present the corrective actions to the user as expert advice 154 on the user interface, and each corrective action may be associated with a confidence level. Corrective actions represent configuration changes to the distributed computing environment 120 that may address the problem condition represented by the pattern. If the user selects a corrective action, the expert computing system 130 may increase the confidence level associated with that pattern/corrective action pair. If the user rejects a corrective action, the expert computing system 130 may decrease the confidence level associated with that pattern/corrective action pair.

If the pattern is not linked to one or more corrective actions in the pattern/corrective action repository 138, then no expert advice 154 is available and the user must resort to a traditional manual troubleshooting technique. After the problem has been corrected, the expert computing system may link the identified pattern to a corrective action in the repository 138. To do this, the expert computing system may identify a pre-problem configuration of the distributed computing environment 120 at or before the start time of the pattern and may identify a post-problem configuration of the distributed computing environment 120 at or after the end time of the pattern. The set of changes between the pre-problem and post-problem configurations represents the corrective action. This pattern/corrective action pair is then available as expert advice should the pattern repeat at a later time.

Corrective action change sets provided by the expert computing system 130 may provide consistent, complete, and correct responses to application problems, and may contribute to improved mean time to repair and client-perceived quality. Such expert systems may also expand automation capabilities for reduced operational expense and improved knowledge management efficiencies. Such expert systems may also reduce the incidence of irrelevant or low-confidence advice when application problems occur.

Figure 2:
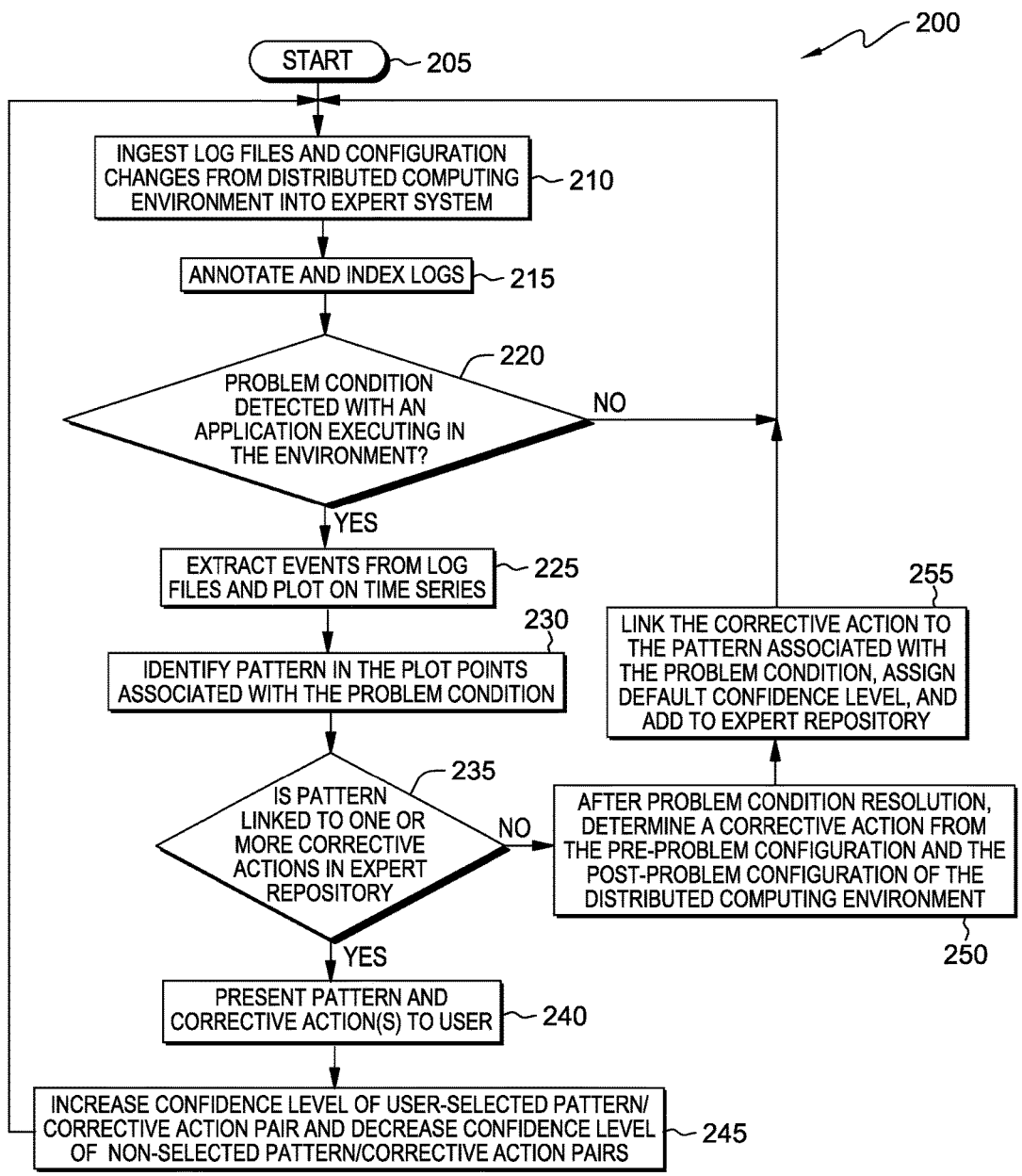
FIG. 2 is a flow diagram illustrating an example method for identifying solutions to application execution problems in a distributed computing environment.

FIG. 2 is a flow diagram illustrating an example method 200 for identifying solutions to application execution problems in a distributed computing environment. From start 205, log files generated at various topological resources in a distributed computing environment, as well as configuration changes to the distributed computing environment, are ingested into the expert computing system at 210. The logs are annotated and indexed at 215.

If a problem condition is detected with an application executing in the distributed computing environment at 220, events associated with the application are extracted from the log files and plotted at 225. The extracted events are plotted on a time series based on the standard application architecture topology with log type and error type precedence to detect a problem pattern identifying a root cause. Problem pattern=combination [error type+log type]+topology, plotted on time series. Predefined policies may be set to look up and calculate precedence based on weight-age assigned to each of the log types and error types. A pattern in the plot points is identified at 230 and associated with the problem condition.

If the identified pattern is linked to any corrective actions in the expert computing system repository at 235, then the pattern and those corrective actions are presented to the user at 240 along with an indication of the confidence level of the corrective action. In some embodiments, only the corrective actions and their confidence levels are presented to the user. If the user selects a presented corrective action, the confidence level associated with the selected corrective action as applied to the current pattern is increased at 245, and the confidence level of any rejected corrective actions as applied to the current pattern is decreased.

If the identified pattern is not linked to any corrective actions in the expert computing system repository at 235, then the expert computing system may learn a new corrective action after the problem is resolved. A pre-problem configuration and a post-problem configuration of the distributed computing environment may be determined at 250. For example, the identified pattern may be correlated to a start time and an end time, with the start time coinciding with a root cause of the problem, and the end time coinciding with recovery from the problem. The pre-problem configuration is the configuration of the distributed computing environment at the start time and the post-problem configuration is the configuration of the distributed computing environment at the end time. The corrective action represents the configuration changes needed to convert the pre-problem configuration to the post-problem configuration. The corrective action is linked to the pattern at 255 and stored in the expert repository. In some embodiments, the pattern/corrective action pair may be assigned a default confidence level.

Figure 3:
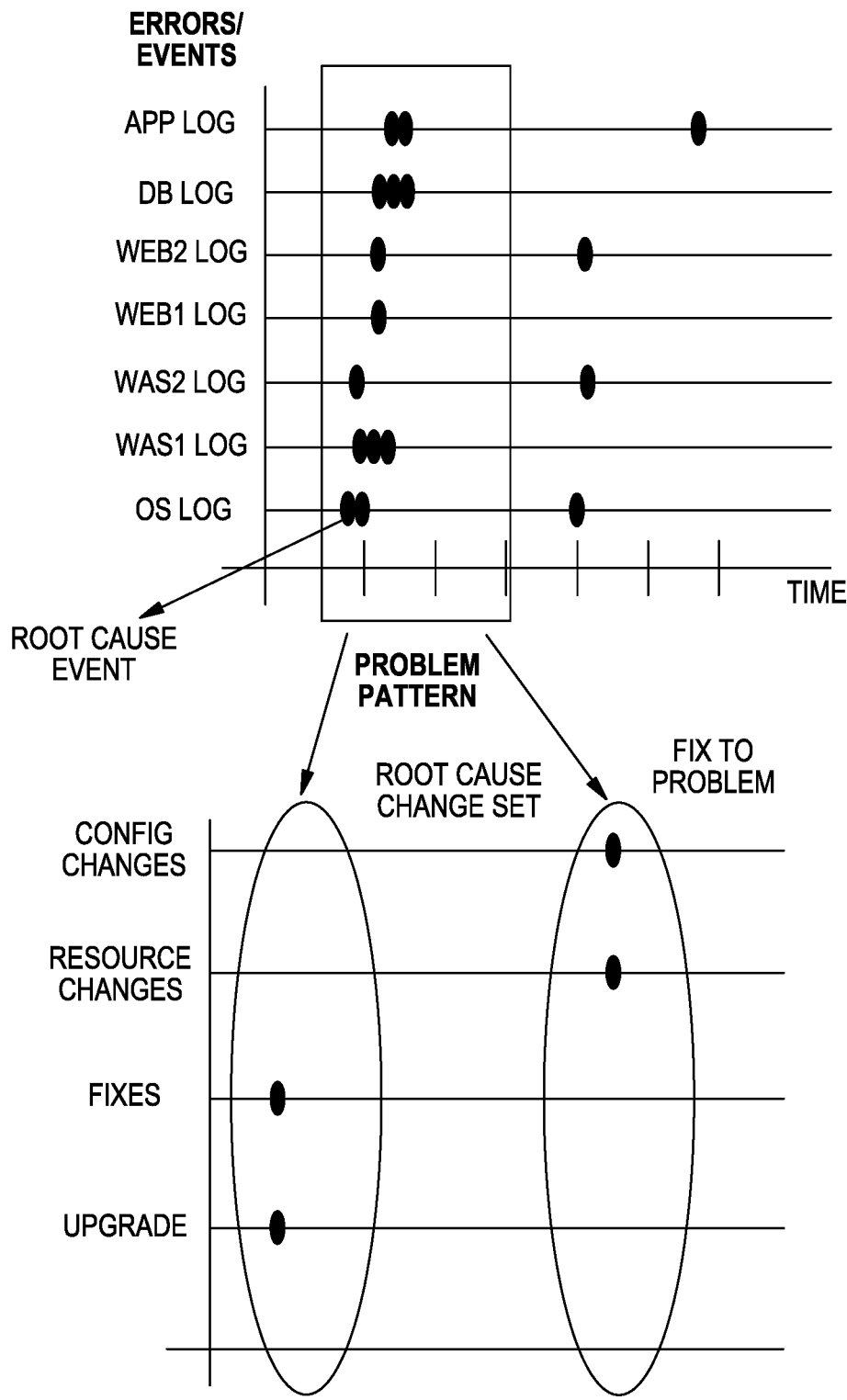
FIG. 3 is example output from an expert computing system for identifying solutions to application execution problems in a distributed computing environment.

FIG. 3 is example output from an expert computing system for identifying solutions to application execution problems in a distributed computing environment. The problem pattern is depicted in the output, as well as the pre-problem configuration and the post-problem configuration. The changes needed to convert the pre-problem configuration to the post-problem configuration are the corrective action, depicted here as the root cause change set.

Figure 4:
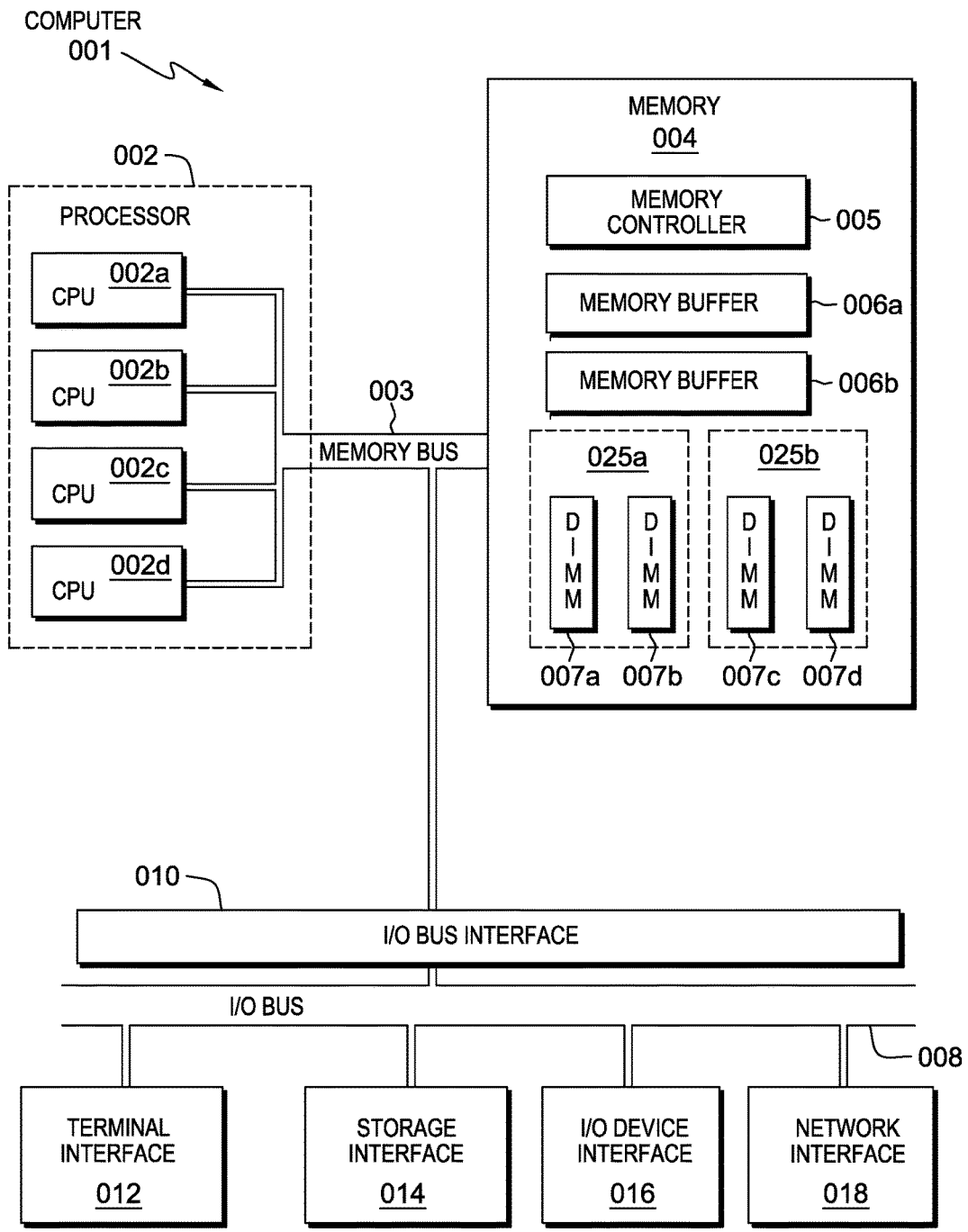
FIG. 4 is a high-level block diagram illustrating an example system for implementing one or more embodiments of the invention.

FIG. 4 depicts a high-level block diagram of an example system for implementing portions of one or more embodiments of the invention. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffers 006 and one or more memory devices 007. In the illustrated embodiment, the memory devices 007 may be dual in-line memory modules (DIMMs), which are a series of dynamic random-access memory (DRAM) chips mounted on a printed circuit board and designed for use in personal computers, workstations, and servers. The use of DRAMs is exemplary only and the memory array used may vary in type as previously mentioned. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 4 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 4 is intended to depict the representative major components of an exemplary computer system 001. But individual components may have greater complexity than represented in FIG. 4, components other than or in addition to those shown in FIG. 4 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be an intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even DRAM may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for identifying a solution to a problem condition associated with execution of an application, the method comprising:
    plotting each of a plurality of events associated with the execution of the application as a plot point on a graph having an x-axis representing a time of occurrence of each event and having a y-axis representing a topological resource associated with each event, the plot point representing a combination of an error type of each event and a log type of each event;
    identifying a pattern in the plot points, the pattern temporally associated with an earlier problem condition, the earlier problem condition associated with the execution of the application;
    identifying a second pattern in the plot points, the second pattern temporally associated with the problem condition; and
    identifying, by an expert system, a corrective action as the solution to the problem condition based on comparing the pattern and the second pattern.

2. The method of claim 1 further comprising:
    extracting, by the expert system, the plurality of events from a plurality of log files, the plurality of log files generated at a plurality of topological resources, each event identified by the error type, the log type, a time of occurrence, and the topological resource.

3. The method of claim 1, wherein the pattern starts at a start time and ends at an end time, the method further comprising:
    identifying a pre-problem configuration of a distributed computing environment before the start time and a post-problem configuration of the distributed computing environment after the end time; and
    linking, by the expert system, the corrective action to the pattern, the corrective action representing configuration changes needed to convert the pre-problem configuration to the post-problem configuration.

4. The method of claim 1, wherein the execution of the application utilizes a plurality of topological resources in a distributed computing environment.

5. The method of claim 1, further comprising:
    displaying, by the expert system, at least part of the graph to a user;
    displaying the corrective action to the user;
    receiving a response from the user, the response associated with the corrective action; and
    modifying, by the expert system and based on the received response, a confidence level associated with the corrective action as the solution to the problem condition.

6. The method of claim 1, further comprising:
    identifying, by the expert system, a second corrective action as a second solution to the problem condition;
    displaying, by the expert system, at least part of the graph to a user;
    displaying the corrective action and the second corrective action to the user;
    receiving a response from the user, the response indicating that the user accepts the corrective action and rejects the second corrective action;
    increasing a confidence level associated with the corrective action as the solution to the problem condition; and
    decreasing a second confidence level associated with the second corrective action as the solution to the problem condition.

7. A computer program product for identifying a solution to a problem condition associated with execution of an application, the computer program product comprising a computer readable storage medium having program instructions embodied therewith, the program instructions executable by a processor to perform a method comprising:
    plotting each of a plurality of events associated with the execution of the application as a plot point on a graph having an x-axis representing a time of occurrence of each event and having a y-axis representing a topological resource associated with each event, the plot point representing a combination of an error type of each event and a log type of each event;
    identifying a pattern in the plot points, the pattern temporally associated with an earlier problem condition, the earlier problem condition associated with the execution of the application;

identifying a second pattern in the plot points, the second pattern temporally associated with the problem condition; and identifying, by an expert system, a corrective action as the solution to the problem condition based on comparing the pattern and the second pattern.

8. The computer program product of claim 7, wherein the method further comprises:

extracting, by the expert system, the plurality of events from a plurality of log files, the plurality of log files generated at a plurality of topological resources, each event identified by the error type, the log type, a time of occurrence, and the topological resource.

9. The computer program product of claim 7, wherein the pattern starts at a start time and ends at an end time, and wherein the method further comprises:

identifying a pre-problem configuration of a distributed computing environment before the start time and a post-problem configuration of the distributed computing environment after the end time; and linking, by the expert system, the corrective action to the pattern, the corrective action representing configuration changes needed to convert the pre-problem configuration to the post-problem configuration.

10. The computer program product of claim 7, wherein the execution of the application utilizes a plurality of topological resources in a distributed computing environment.

11. The computer program product of claim 7, wherein the method further comprises:

displaying, by the expert system, at least part of the graph to a user;

displaying the corrective action to the user;

receiving a response from the user, the response associated with the corrective action; and modifying, by the expert system and based on the received response, a confidence level associated with the corrective action as the solution to the problem condition.

12. The computer program product of claim 7, wherein the method further comprises:

identifying, by the expert system, a second corrective action as a second solution to the problem condition;

displaying, by the expert system, at least part of the graph to a user;

displaying the corrective action and the second corrective action to the user;

receiving a response from the user, the response indicating that the user accepts the corrective action and rejects the second corrective action;

increasing a confidence level associated with the corrective action as the solution to the problem condition; and decreasing a second confidence level associated with the second corrective action as the solution to the problem condition.

13. A computing system for identifying a solution to a problem condition associated with execution of an application, the computing system comprising:

a memory; and a processor in communication with the memory, wherein the computing system is configured to perform a method, the method comprising:

plotting each of a plurality of events associated with the execution of the application as a plot point on a graph having an x-axis representing a time of occurrence of each event and having a y-axis representing a topological resource associated with each event, the plot point representing a combination of an error type of each event and a log type of each event;

identifying a pattern in the plot points, the pattern temporally associated with an earlier problem condition, the earlier problem condition associated with the execution of the application;

identifying a second pattern in the plot points, the second pattern temporally associated with the problem condition; and identifying, by an expert system, a corrective action as the solution to the problem condition based on comparing the pattern and the second pattern.

14. The computing system of claim 13, wherein the method further comprises:

extracting, by the expert system, the plurality of events from a plurality of log files, the plurality of log files generated at a plurality of topological resources, each event identified by the error type, the log type, a time of occurrence, and the topological resource.

15. The computing system of claim 13, wherein the pattern starts at a start time and ends at an end time, and wherein the method further comprises:

identifying a pre-problem configuration of a distributed computing environment before the start time and a post-problem configuration of the distributed computing environment after the end time; and linking, by the expert system, the corrective action to the pattern, the corrective action representing configuration changes needed to convert the pre-problem configuration to the post-problem configuration.

16. The computing system of claim 13, wherein the execution of the application utilizes a plurality of topological resources in a distributed computing environment.

17. The computing system of claim 13, wherein the method further comprises:

displaying, by the expert system, at least part of the graph to a user;

displaying the corrective action to the user;

receiving a response from the user, the response associated with the corrective action; and modifying, by the expert system and based on the received response, a confidence level associated with the corrective action as the solution to the problem condition.

18. The computing system of claim 13, wherein the method further comprises:

identifying, by the expert system, a second corrective action as a second solution to the problem condition;

displaying, by the expert system, at least part of the graph to a user;

displaying the corrective action and the second corrective action to the user;

receiving a response from the user, the response indicating that the user accepts the corrective action and rejects the second corrective action;

increasing a confidence level associated with the corrective action as the solution to the problem condition; and decreasing a second confidence level associated with the second corrective action as the solution to the problem condition.

* * * * *